(12) United States Patent
Daw Perez et al.

(10) Patent No.: US 10,994,865 B2
(45) Date of Patent: May 4, 2021

(54) AUTONOMOUS SYSTEM FOR AIR CARGO END-TO-END OPERATIONS

(71) Applicant: GOODRICH CORPORATION, Charlotte, NC (US)

(72) Inventors: Zamira A. Daw Perez, Albany, CA (US); Alessandro Pinto, Kensington, CA (US); Richa Varma, El Cerrito, CA (US); Xiaobin Zhang, Morgan Hill, CA (US); Binu M. Nair, San Mateo, CA (US)

(73) Assignee: Goodrich Corporation, Charlotte, NC (US)

( * ) Notice: Subject to any disclaimer, the term of this patent is extended or adjusted under 35 U.S.C. 154(b) by 159 days.

(21) Appl. No.: 16/166,705

(22) Filed: Oct. 22, 2018

(65) Prior Publication Data

US 2020/0122858 A1   Apr. 23, 2020

(51) Int. Cl.

| | |
|---|---|
| *B64F 1/32* | (2006.01) |
| *G05D 1/02* | (2020.01) |
| *B65G 67/00* | (2006.01) |
| *G05D 1/00* | (2006.01) |
| *H04W 4/02* | (2018.01) |

(52) U.S. Cl.
CPC .............. *B64F 1/32* (2013.01); *B65G 67/00* (2013.01); *G05D 1/0088* (2013.01); *G05D 1/0268* (2013.01); *B65G 2814/0398* (2013.01); *G05D 2201/0216* (2013.01); *H04W 4/025* (2013.01)

(58) Field of Classification Search
CPC .... B64F 1/32; B64F 1/322; B65G 2814/0398; G05D 1/0088; G05D 1/0268; G05D 2201/0216

See application file for complete search history.

(56) References Cited

U.S. PATENT DOCUMENTS

| | | | |
|---|---|---|---|
| 3,655,076 A * | 4/1972 | Carder | B65G 67/00 414/352 |
| 6,905,095 B1 * | 6/2005 | Gruzdeva | B60P 1/02 244/137.1 |
| 7,648,329 B2 * | 1/2010 | Chilson | B60L 15/2036 414/809 |
| 9,075,412 B2 * | 7/2015 | Dixon | G05D 1/0027 |
| 9,120,568 B2 * | 9/2015 | Herman | B64F 1/125 |
| 9,944,213 B2 | 4/2018 | Ambrosio et al. | |
| 9,952,589 B1 * | 4/2018 | Brazeau | G05B 19/41895 |
| 10,005,564 B1 * | 6/2018 | Bhatia | B64C 1/22 |
| 10,048,697 B1 | 8/2018 | Theobald | |
| 10,380,473 B2 * | 8/2019 | Manci | G05D 1/021 |
| 10,662,045 B2 * | 5/2020 | Gariepy | B66F 9/063 |
| 10,732,623 B2 * | 8/2020 | Tsubota | G05D 1/005 |

(Continued)

FOREIGN PATENT DOCUMENTS

WO    2017072771    5/2017

*Primary Examiner* — James Keenan

(74) *Attorney, Agent, or Firm* — Snell & Wilmer L.L.P.

(57) ABSTRACT

The present disclosure provides an end-to-end cargo handling system. The end-to-end cargo handling system comprises a transportation unit comprising a first sensing agent, a lift unit comprising a second sensing agent, and a control module in communication with the transportation unit and the lift unit via a network, wherein the transportation unit and the lift unit are configured to move a cargo unit from a first location to a second location autonomously.

8 Claims, 6 Drawing Sheets

(56) References Cited

U.S. PATENT DOCUMENTS

| | | | |
|---|---|---|---|
| 10,773,938 B2* | 9/2020 | Kim | G05D 1/0225 |
| 10,815,080 B2* | 10/2020 | Anderson | B65G 67/02 |
| 2017/0364073 A1 | 12/2017 | Guy | |

* cited by examiner

AUTONOMOUS SYSTEM FOR AIR CARGO END-TO-END OPERATIONS

FIELD OF THE DISCLOSURE

The present disclosure relates to cargo handling systems, and more particularly, to aircraft cargo handling systems.

BACKGROUND OF THE DISCLOSURE

In typical end-to-end cargo loading operations, cargo units are moved from a freighter to an assigned location on an aircraft. Conventionally, the cargo units, otherwise known as unit load devices or "ULDs," are prepared in a warehouse by a human operator and moved to the aircraft for loading via a forklift or some other human-operated machinery. The ULDs may then be transported onto the aircraft, wherein other systems may move the ULD to its final location. Such conventional human-operated end-to-end cargo loading systems, however, may be subject to inefficiency due to human error or pose safety risks for human operators.

SUMMARY OF THE DISCLOSURE

An end-to-end cargo handling system may comprise a transportation unit comprising a first sensing agent, a lift unit comprising a second sensing agent, and a control module in communication with the transportation unit and the lift unit via a network, wherein the transportation unit and the lift unit are configured to move a cargo unit from a first location to a second location autonomously.

In various embodiments, the first location is located in a cargo warehouse and the second location is located on a cargo deck of an aircraft. The first location may be located on a cargo deck of an aircraft and the second location is located in a cargo warehouse. The first location may be located on a freighter and the second location is located on a cargo deck of an aircraft. The transportation unit may be configured to self-load the cargo unit for transportation. The lift unit may comprise one of a scissor lift, fork lift, conveyer belt, or overhead crane. The control module may be configured access one or more databases concerning a status of the cargo unit. The lift unit may comprise a sensor capable of sensing a presence of a cargo unit on the lift unit. The first sensing agent may comprise a sensing module, a computing module, and a communication module and the second sensing agent may comprise a sensing module, a computing module, and a communication module. The lift unit and transportation unit may be configured to communicate via the first sensing agent communication module and the second sensing agent communication module to move the cargo unit from the first location to the second location.

A multifunction unit for a cargo handling system may comprise a transportation unit comprising a first sensing agent and a lift unit comprising a second sensing agent coupled to the transportation unit, wherein the multifunction unit is configured to operate autonomously to move a cargo unit from a first location to a second location.

In various embodiments, the transportation unit comprises a transportation unit transceiver and the lift unit comprises a lift unit transceiver. The transportation unit transceiver and the lift unit transceiver may be configured to receive instructions via a control module over a network. The transportation unit transceiver and the lift unit transceiver may be configured to communicate over the network. The multifunction unit may further comprise an aircraft transceiver configured to communicate with the transportation unit transceiver and the lift unit transceiver.

An autonomous method of handling a cargo unit may comprise transmitting, via a network, a first location corresponding to an initial location of a cargo unit to a transportation unit, transmitting, via the network, a second location corresponding to a cargo unit destination location to the transportation unit, moving the transportation unit to the first location, loading the cargo unit onto the transportation unit, and transporting, via the transportation unit, the cargo unit from the first location to the second location.

In various embodiments, the autonomous method may further comprise transferring the cargo unit from the transportation unit to a lift unit and lifting, via the lift unit, the cargo unit to an elevation of a cargo deck of an aircraft. The autonomous method may further comprise instructing the transportation unit and the lift unit to act via a control module. The second location may correspond to the cargo unit destination location is a cargo deck of an aircraft.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with autonomous aircraft cargo handling systems. However, various aspects of the disclosed embodiments may be adapted for performance in a variety of other systems such as ground cargo handling systems. As such, numerous applications of the present disclosure may be realized.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo handling systems as disclosed herein may allow autonomous loading and/or unloading of cargo units from an aircraft. In that regard, aircraft cargo handling systems as disclosed herein may result in increased efficiency of loading and unloading processes and reduce human operator involvement and the human error and safety risks involved therewith.

Figure 1:
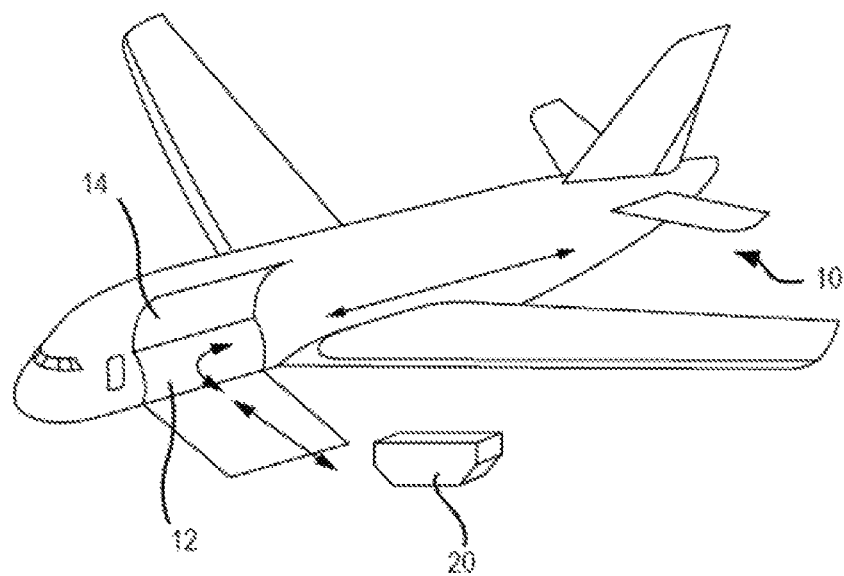
FIG. 1 illustrates a schematic view of an aircraft being loaded with a cargo unit, in accordance with various embodiments.

In various embodiments, and with reference to FIG. 1, a schematic view of an aircraft 10 having a cargo deck 12 is illustrated. Aircraft 10 may comprise a cargo load door 14, for example, at a side of the fuselage structure of aircraft 10, at an aft end of the fuselage structure, and/or at any other suitable location. Cargo unit 20 may be loaded through cargo load door 14 and onto cargo deck 12 of aircraft 10 or unloaded from cargo deck 12 of aircraft 10. Although cargo unit 20 is illustrated as a cargo container, cargo unit 20 could also be a pallet, an irregularly shaped object, an irregularly shaped container, or other cargo.

Items to be shipped by air, freight, and/or the like are typically loaded first onto specially configured pallets or into specially configured containers, also known as unit load devices or "ULDs." In that regard, as referred to herein, "cargo unit" may also refer to a ULD. ULDs are available in various sizes and capacities, and are typically standardized in dimension and shape. Once loaded with cargo items, the ULD is transferred to aircraft 10, and is loaded onto aircraft 10 through cargo load door 14 using a conveyor ramp, scissor lift, or the like. Once inside aircraft 10, the ULD is moved within cargo deck 12 to its final stowage location, as discussed further herein. Multiple ULDs may be brought on-board aircraft 10, during one or more loading procedures (e.g., at separate destinations), with each ULD being placed in its respective stowage and transportation location in cargo deck 12. After aircraft 10 has reached its destination, one or more ULDs may be unloaded from aircraft 10 similarly, but in reverse sequence to the loading procedure.

Figure 2:
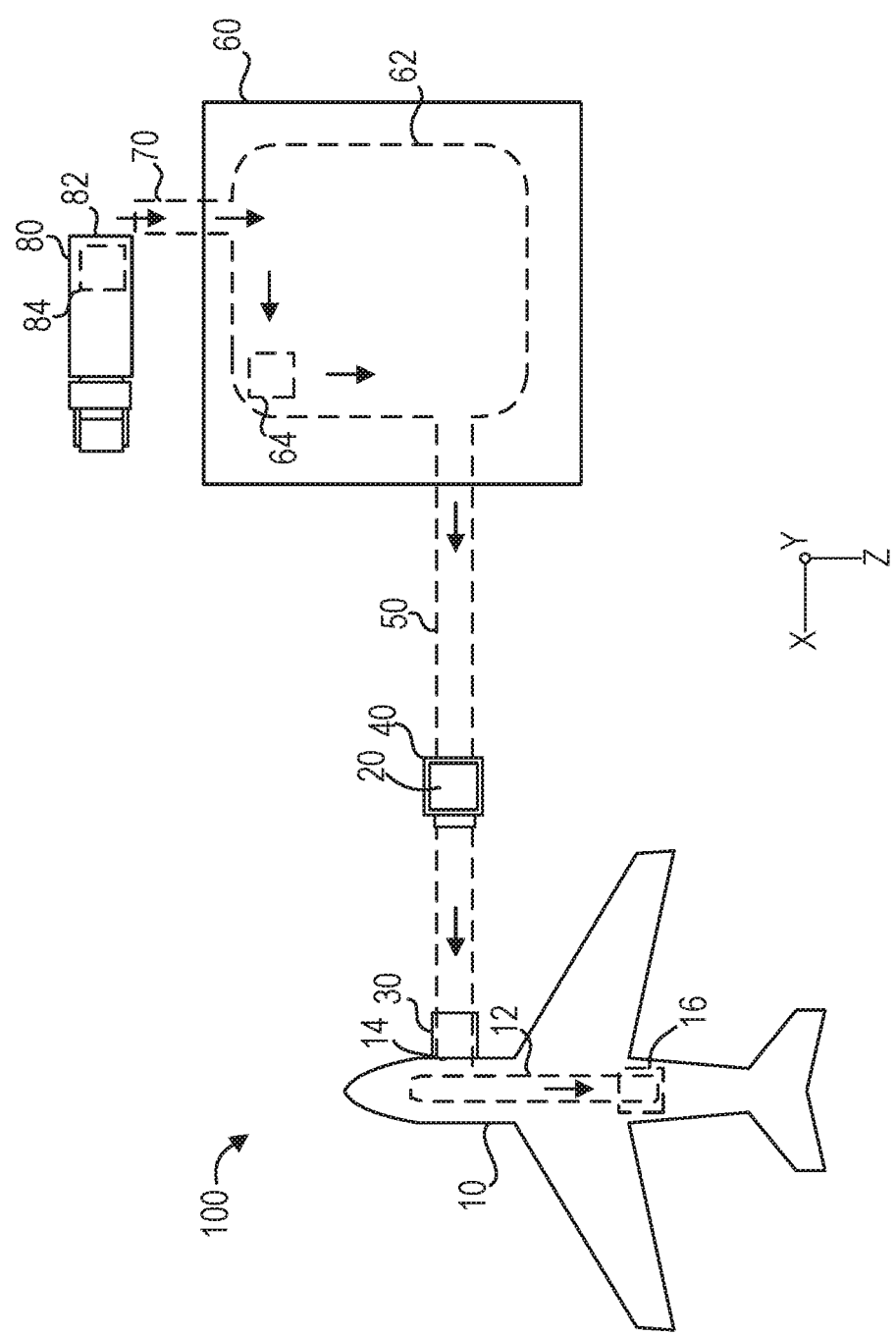
FIG. 2 illustrates a top view of an end-to-end cargo loading operation, in accordance with various embodiments.

In various embodiments, and with reference to FIG. 2, a top view of an end-to-end cargo loading operation 100 illustrated from a top view, in accordance with various embodiments. Aircraft 10 may comprise a cargo deck 12 configured to receive and store one or more cargo units 20 for a flight. As referred to herein, cargo deck 12 may comprise an "active" cargo deck comprising a plurality of electromechanical actuators embedded in cargo deck 12 or a "passive" cargo deck devoid of a plurality of electromechanical actuators embedded in cargo deck 12. Cargo deck 12 may comprise a plurality of rolling elements on a surface of cargo deck 22 configured to assist in movement of cargo unit 20 over cargo deck 12. Cargo deck 12 may extend aftward (in the positive Z-direction) toward a rear portion of aircraft 10 and be positioned adjacent to cargo load door 14. However, there are many other aircraft cargo deck configurations to which the embodiments of the disclosure can be implemented. For example, various aircraft, particularly those designed primarily for the transportation of cargo without passengers, may have the upper passenger deck removed and an additional larger cargo deck installed. Cargo unit 20 may be transported to destination location 16, wherein cargo unit 20 may be secured for the duration of a flight. While illustrated as being positioned at an aft-most location on cargo deck 12, destination location 16 may be at any location on cargo deck 12 such as a forward location of cargo deck 12 or middle portion of cargo deck 12. Further, destination location 16 need not be directly on top of cargo deck 12 and may be on top of other cargo units already positioned directly on cargo deck 12. Destination location 16 may define one "end" of the end-to-end cargo loading operation 100.

In various embodiments, cargo load door 14 may be adjacent to a lift unit 30. Lift unit 30 may be configured to lift cargo unit 20 from a ground surface to an elevation equal or greater than that of cargo deck 12. Cargo unit 20 may then be loaded onto aircraft 10 through cargo load door 14. As discussed further herein, cargo unit 20 may be moved from lift unit 30 and moved along a plurality of roller elements on cargo deck 12 until cargo unit 20 arrives at destination location 16. Lift unit 30 may be positioned on a path 50 which may extend between aircraft 10 and warehouse 60. In various embodiments, more than one path 50 may be situated between aircraft 10 and warehouse 60.

Still referring to FIG. 2, in various embodiments one or more transportation units 40 may be configured to travel to and from aircraft 10 and warehouse 60. Transportation unit 40 may be configured to transport cargo unit 20 to lift unit 30, wherein lift unit 30 can then elevate cargo unit 20 such that it can be moved through cargo load door 14 and onto cargo deck 12. As discussed further herein, transportation unit 40 may be configured to travel from warehouse 60 along path 50 to aircraft 10 and then travel from aircraft 10 along path 50 to warehouse 60. Stated otherwise, transportation unit 40 may travel to and from aircraft 10 such that cargo transportation unit may assist in loading and unloading operations.

Transportation unit 40 may be configured to enter warehouse 60 and move about cargo loading area 62 wherein transportation unit 40 may be loaded with and/or load a cargo unit 20. For example, transportation unit 40 may be configured to travel to intermediate location 64, where transportation unit 40 may be loaded with cargo unit 20 with the assistance of a human operator manually maneuvering cargo unit 20 or moving cargo unit with a fork lift or the like. In various embodiments, transportation unit 40 may be configured to self-load cargo unit 20 through an electromechanical actuator on transportation unit 40. In various embodiments, such an actuator may be an electrically, hydraulically, or pneumatically powered clamp, lift, pulley system, or the like.

In various embodiments, cargo unit 20 may be positioned in intermediate location 64 by a human operator manually maneuvering cargo unit 20 or moving cargo unit with a fork lift or the like. Prior to being positioned in intermediate location 64, Cargo unit 20 may be positioned at initial location 84 on a freighter 80, which in various embodiments may be a freight truck, van, or the like. Cargo unit 20 may be moved from freighter 80 through a freighter loading door 82 and along path 70 to intermediate location 64 in warehouse 60. In various embodiments, cargo unit 20 may be positioned in intermediate location 64 via human operator or via transportation unit 40. Initial location 84 may define the other "end" of the end-to-end cargo loading operation 100. However, in various embodiments, intermediate location 64 may also define an "end" of the end-to-end cargo loading operation 100. Accordingly, as referred to herein, end-to-end cargo handling operations and/or systems may refer to movement of a cargo unit from a freighter to a warehouse to an aircraft, from a warehouse to an aircraft, or any other combination of movement between two locations.

In various embodiments, transportation unit 40 may be configured to move along path 50, throughout warehouse 60, and along path 70. In various other embodiments, transportation unit 40 may be configured to operate on path 50, in warehouse 60, or on path 70 or any combination thereof. In various embodiments, a separate transportation unit 40 may be positioned on each of path 50, warehouse 60, and path 70. Therefore, a single transportation unit 40 or a plurality of transportation units 40 may assist in moving cargo unit 20 between intermediate location 64 or initial location 84 and destination location 16.

Figure 3A:
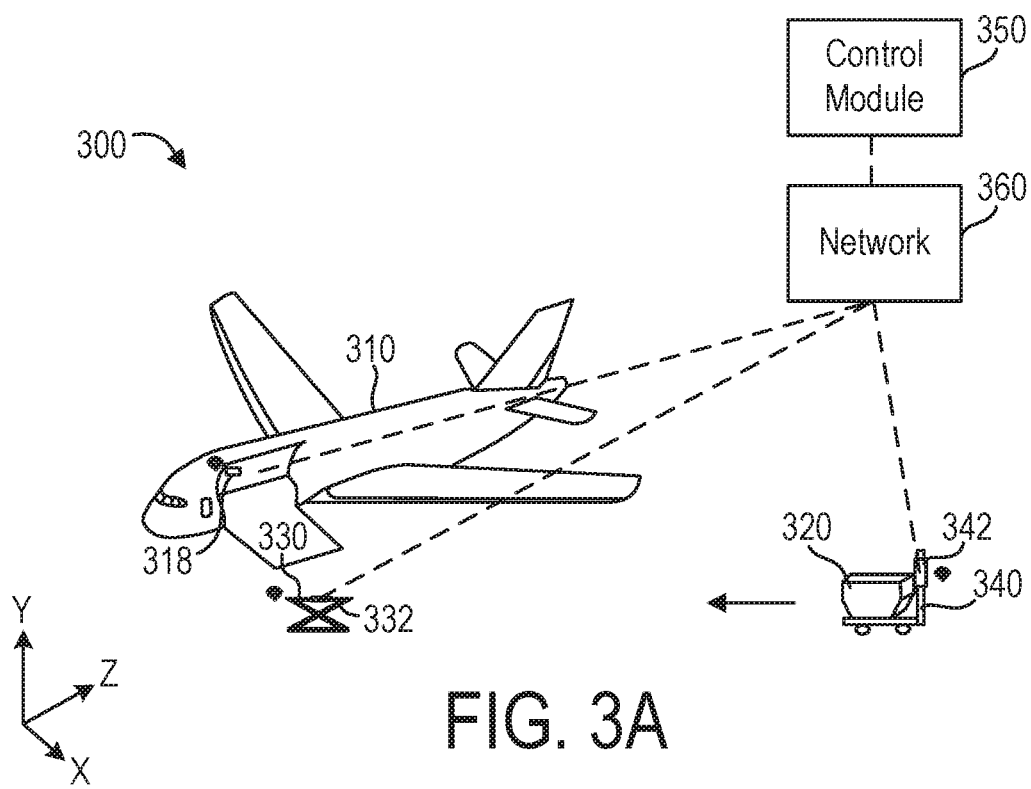
FIGS. 3A and 3B illustrate perspective views of an autonomous end-to-end cargo handling system, in accordance with various embodiments.
Figure 3B:
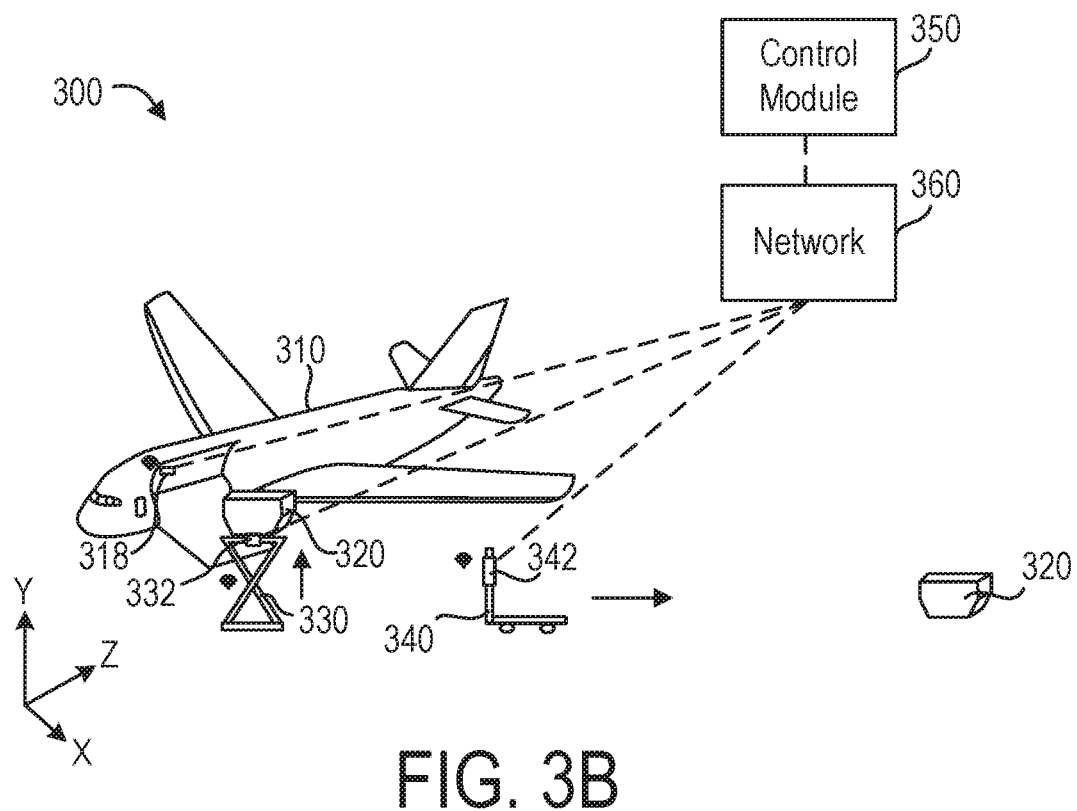

Moving on and with reference to FIGS. 3A and 3B, autonomous end-to-end cargo handling system 300 is illustrated, in accordance with various embodiments. Autonomous end-to-end cargo handling system 300 may be configured to autonomously transfer one or more cargo units 320 from a first location to a second location. In various embodiments, first location and/or second location may be any one of a destination location 16, intermediate location 64, or, initial location 84 (with momentary reference to FIG. 2). As such, autonomous end-to-end cargo handling system 300 may assist in loading or unloading aircraft 10 with one or more cargo units 20.

In various embodiments, autonomous end-to-end cargo handling system 300 may comprise aircraft 310, lift unit 330, and transportation unit 340. Aircraft 310 may comprise an aircraft transceiver 318, lift unit 330 may comprise a lift unit transceiver 332, and transportation unit 340 may comprise a transportation unit transceiver 342. Aircraft transceiver 318, lift unit transceiver 332, and transportation unit transceiver 342 may each comprise a receiver configured to receive radio signals and a transmitter configured to transmit radio signals. As such, aircraft transceiver 318, lift unit transceiver 332, and transportation unit transceiver 342 may be in communication with each other over a network 360. Network 360 may be in communication with a control module 350 configured to provide instructions to aircraft 310, lift unit 330, and transportation unit 340, through aircraft transceiver 318, lift unit transceiver 332, and/or transportation transceiver 332, respectively.

While illustrated as a wireless system, network 360 may carry signals and may be implemented using wire, cable, fiber optics, a telephone line, a cellular link, a radio frequency (RF) link, and/or other communications channels. In various embodiments, the various system components, including aircraft 310, lift unit 330, and/or transportation unit 340 may be independently, separately or collectively suitably coupled to the network 360 via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

In various embodiments control module 350 may provide instructions to transportation unit 340, lift unit 330, and aircraft 310 such that the various components may autonomously assist in loading or unloading cargo unit 320. For example, in various embodiments, control module 350 may communicate through network 360 with transportation unit 340 to move to a first location wherein transportation unit 340 can be loaded or self-load cargo unit 320. Control module may communicate various parameters to cargo transportation unit such as a pick-up location, drop-off location, routing information, cargo unit identity, or other variables to assist transportation unit 340 in transporting cargo unit 320. Control module 350 may be configured to access one or more databases concerning a state of cargo unit 320, for example, a cargo unit location, destination location, routing information, size, weight or other variables.

With specific reference to FIG. 3A, in various embodiments, transportation unit 340 loaded with cargo unit 320 may travel to a location of lift unit 330. In various embodiments, transportation unit 340 may comprise any suitable transportation mechanism, including for example, an electrically or gas powered cart, buggy, carriage, or the like. As previously stated with reference to FIG. 2, transportation unit 340 may travel along a path from a warehouse location to a location adjacent to lift unit 330. Transportation unit 340 may receive positioning information of lift unit 330 via network 360 and may travel to that location to transfer cargo unit 320 to lift unit 330.

With reference to FIG. 3B, in various embodiments, cargo unit 320 may be transferred from transportation unit 340 to lift unit 330. Cargo unit 320 may be transferred from transportation unit 340 to lift unit 330 via human operator, human operated machinery such as a fork lift or the like, via actuators present on transportation unit 340 or on lift unit 330, or in any other suitable manner. Upon receiving cargo unit 320, lift unit 330 may be instructed via control module 350 to lift cargo unit 320 to a location near a cargo load door of aircraft 310. In various embodiments, lift unit 330 may comprise a scissor lift, fork lift, conveyer belt, overhead crane, or other suitable mechanism capable of raising and/or lowering cargo unit 320 to and/or from aircraft 310. In various embodiments, lift unit 330 may comprise a sensor configured to sense the presence of cargo unit 320, signaling the need to lift cargo unit 320. For example, in various embodiments, lift unit 330 may comprise a camera, a structured light sensor, a light detection and ranging (LiDAR) sensor, an infrared sensor, a depth sensor (e.g., an IR projector/camera assembly such as a MICROSOFT® Kinect®, an ASUS® Xtion PRO®, etc.), a 3D scanner/camera, an ultrasound range finder, a radar sensor, and/or any other suitable sensing device. The sensor may also comprise a sensor capable of sensing a weight of an object (a "weight sensor") such as, for example, a pressure sensor, a piezo-electric sensor, and/or the like. During this time, transportation unit 340 may also be receiving instructions from control module 350 to travel elsewhere to complete other tasks such as retrieving another cargo unit waiting to be loaded on aircraft 310. Once cargo loading of aircraft 310 is complete, the aircraft cargo loading door may close via one or more sensor or through instructions provided by control module 350 over network 360 to aircraft transceiver 318.

Figure 4A:
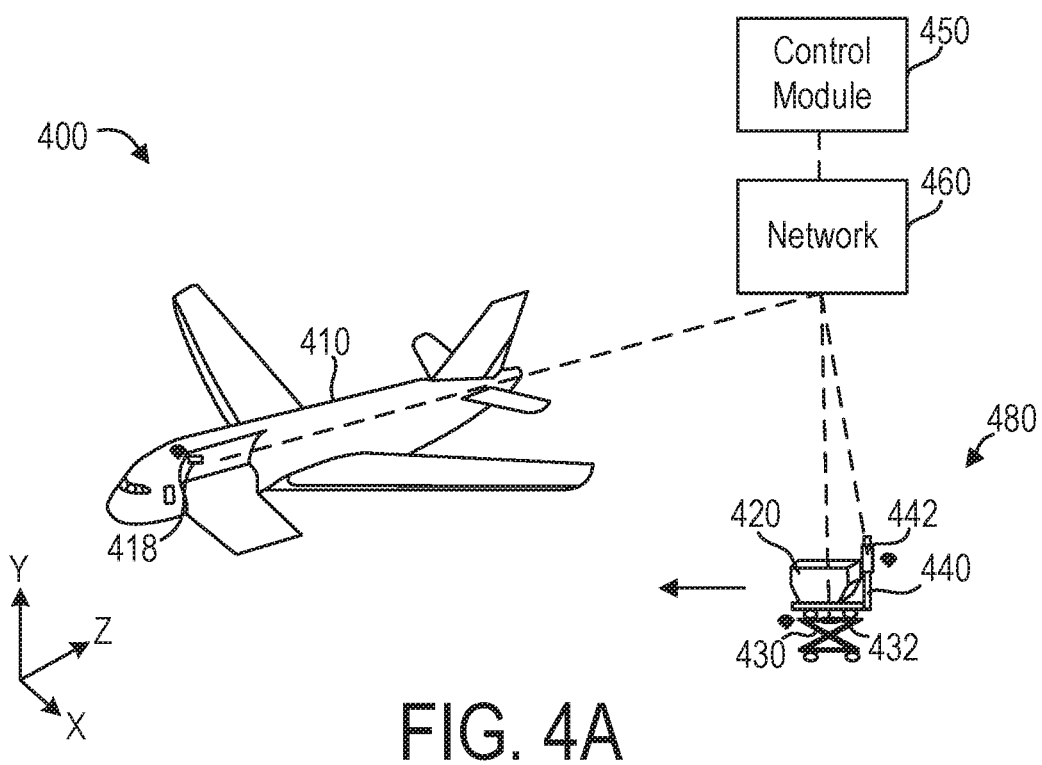
FIGS. 4A and 4B illustrate perspective views of an autonomous end-to-end cargo handling system, in accordance with various embodiments.
Figure 4B:
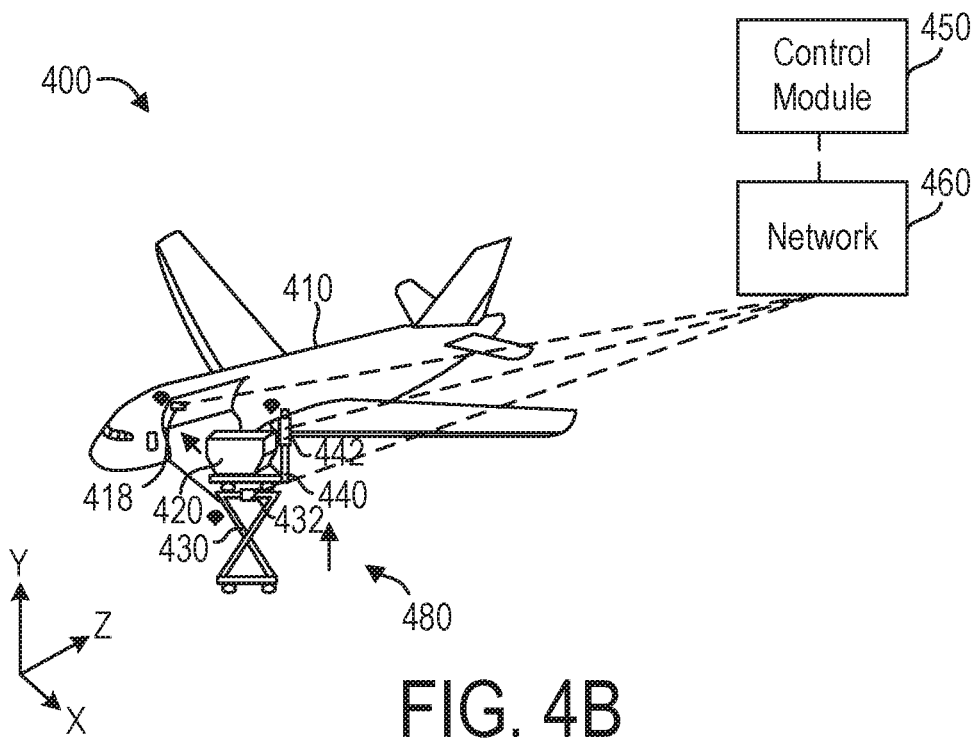

Moving on and with reference to FIGS. 4A and 4B, autonomous end-to-end cargo handling system 400 is illustrated, in accordance with various embodiments. Autonomous end-to-end cargo handling system 400 may be similar to the autonomous end-to-end cargo handling system 300 of FIGS. 3A and 3B. For example, autonomous end-to-end cargo handling system 400 may comprise an aircraft 410 comprising an aircraft transceiver 418 configured to communicate with various other components via a network 460 in communication with a control module 450. In various embodiments, autonomous end-to-end cargo handling system 400 may comprise an autonomous multifunction unit 480, which may be configured to assist in one or more tasks. For example, in various embodiments, multifunction unit 480 may be configured to travel between a first location and a second location, load one or more cargo units 420, relocate the one or more cargo units 420, and lift the one or more cargo units 420 to be loaded onto aircraft 410.

For example, in various embodiments, multifunction unit 480 may comprise a lift unit 430 comprising a lift unit transceiver 432 and a transportation unit 440 comprising a transportation unit transceiver 442. In various embodiments, both lift unit 30 and transportation unit 440 may be configured to move between a first location and second location. Lift unit 430 and transportation unit 440 may be temporarily or permanently coupled.

In various embodiments and with specific reference to FIG. 4A, control module 450 may communicate with multifunction unit 480 and instruct multifunction unit 480 to travel to a first location corresponding to a location of one or more cargo units 420. Upon arriving at the first location, multifunction unit 480 may be loaded or self-load cargo unit 420. Multifunction unit 480 may then be instructed via control module 450 to transport cargo unit to a second location such as near aircraft 410.

With reference to FIG. 4B, in various embodiments, multifunction unit 480 may be configured to lift cargo unit 420 to a cargo load door of aircraft 410. For example, control module 450 may communicate instructions to lift unit 430 of multifunction unit 480 and instruct lift unit 430 to lift cargo unit 420 or a sensor present on lift unit 430 may signal a need to lift cargo unit 420. In various embodiments, upon reaching suitable cargo elevation, transportation unit 440 may detach from lift unit 430 and transport cargo unit throughout a cargo bay of aircraft 410. Accordingly, in various embodiments, multifunction unit 480 comprising multiple subcomponents may be configured to transport cargo unit 420 from a first location to a second location autonomously.

Figure 5:
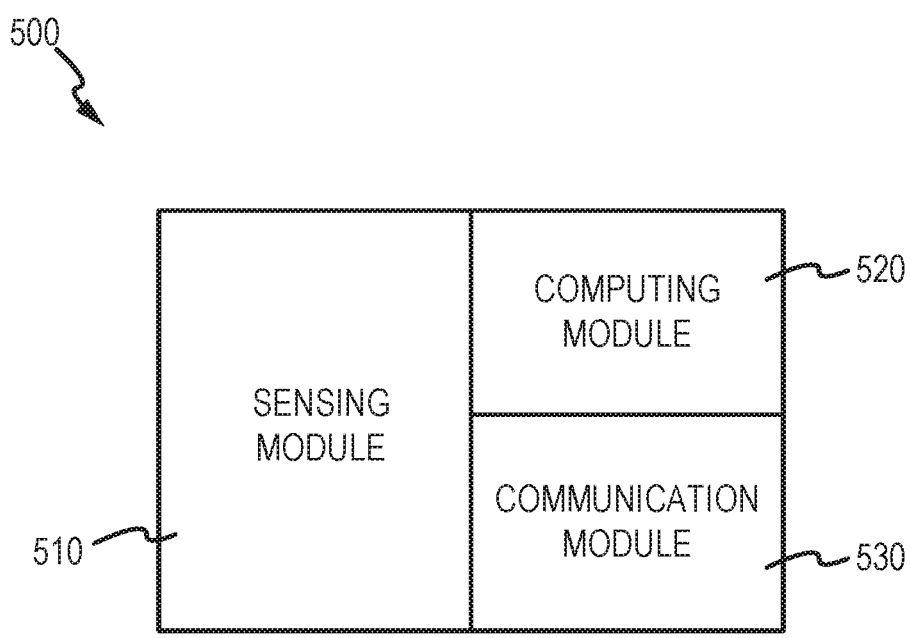
FIG. 5 illustrates a block diagram of an exemplary sensing agent, in accordance with various embodiments.

With reference to FIG. 5, an exemplary sensing agent 500 is illustrated, in accordance with various embodiments. In various embodiments, one or more components of the autonomous end-to-end cargo handling systems described herein may comprise one or more sensing agents 500 in order to operate autonomously in addition to or instead of receiving instructions from a control module over a network. For example, in various embodiments, lift unit 330, transportation unit 340, and/or multifunction unit 480 may comprise sensing agent 500 in order to communicate with each other and/or monitor surroundings in order to transport a cargo unit from a first location to a second location (with momentary reference to FIG. 3A, FIG. 3B, FIG. 4A, and FIG. 4B). As such, lift unit 330, transportation unit 340, and/or multifunction unit 480 may create a distributed network of sensing agents 500 configured to locate, load, transfer, and/or move a cargo unit from a first location to a second location.

In various embodiments, each sensing agent 500 may comprise any suitable apparatus capable of monitoring and gathering data during the cargo loading process. Each sensing agent 500 may also be computer based, and may comprise a processor, a tangible non-transitory computer-readable memory, and/or a network interface, along with other suitable system software and hardware components. Instructions stored on the tangible non-transitory memory may allow each sensing agent 500 to perform various functions, as described herein.

System program instructions and/or processor instructions may be loaded onto a tangible, non-transitory, computer-readable medium (also referred to herein as a tangible, non-transitory, memory) having instructions stored thereon that, in response to execution by a controller, may cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

In various embodiments, each sensing agent 500 may also comprise various subcomponents to aid in monitoring and gathering data. For example, each sensing agent 500 may comprise a sensing module 510 configured to sense a location of a cargo unit, a computing module 520, and/or a communication module 530. Sensing module 510, computing module 520, and/or communication module 530 may be in operative and/or electronic communication with each other. Computing module 520 may include logic configured to control sensing module 510 and/or communication module 530. In various embodiments, sensing module 510 may comprise any suitable apparatus, hardware, and/or software capable of monitoring a portion between two locations such as between an aircraft and a warehouse and/or freighter. Each sensing agent 500 may comprise one or more sensing modules 510. For example, sensing module 510 may comprise at least one of a camera, a structured light sensor, a light detection and ranging (LiDAR) sensor, an infrared sensor, a depth sensor (e.g., an IR projector/camera assembly such as a MICROSOFT® Kinect®, an ASUS® Xtion PRO®, etc.), a 3D scanner/camera, an ultrasound range finder, a radar sensor, and/or any other suitable sensing device. Each sensing module 510 may also comprise sensors to sense a weight of an object (a "weight sensor") such as, for example, a pressure sensor, a piezo-electric sensor, and/or the like. Accordingly, lift unit 330, transportation unit 340, and/or multifunction unit 480 may be configured to adjust autonomously in real time to any variables not anticipated by the control module such as the presence of foreign objects between the first location and the second location, nonconforming cargo units, and/or adjustments to the first and/or second position. Further, lift unit 330, transportation unit 340, and/or multifunction unit 480 may communicate via communication module 530 of sensing agent 500 to transfer a cargo unit from a warehouse to transportation unit 340 and/or multifunction unit 480, from transportation unit 340 to lift unit 330, and/or from lift unit 330 and/or multifunction unit 480 to an aircraft.

As discussed herein, autonomous end-to-end cargo handling systems may be configured to efficiently and safely transport cargo units to and from an aircraft or other location without the need for human operators. Such systems may be reduce costs associated with human labor, reduce safety risks involved with human operators, and reduce human error associated with the scheduling and placement of such cargo units.

Figure 6:
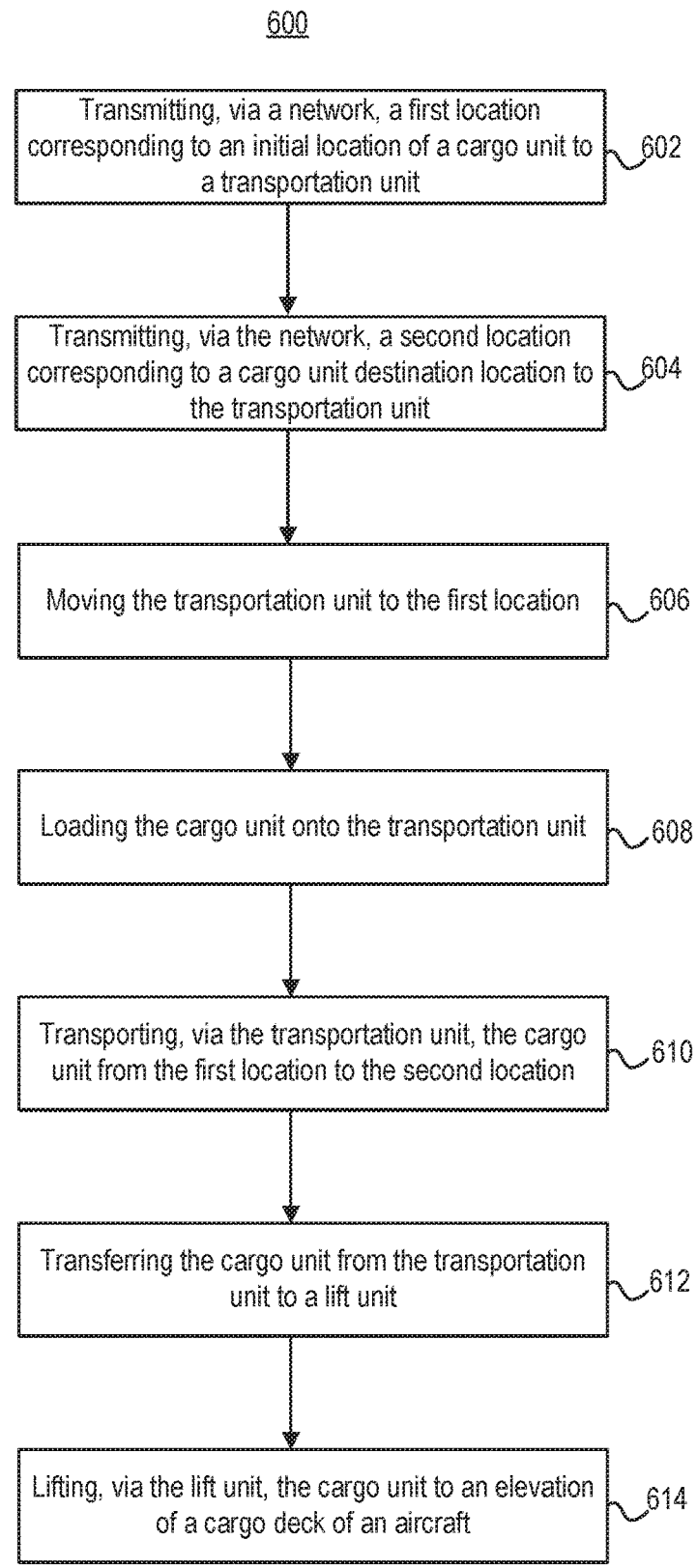
FIG. 6 illustrates an autonomous method of handling a cargo unit, in accordance with various embodiments.

A block diagram illustrating an autonomous method of handling a cargo unit via is illustrated in FIG. 6, in accordance with various embodiments. The method may comprise transmitting, via a network, a first location corresponding to an initial location of a cargo unit to a transportation unit (step 602). The method may comprise transmitting, via the network, a second cargo location corresponding to a cargo unit destination location to the transportation unit (step 604). The method may comprise moving the transportation unit to the first location (step 606). The method may comprise loading the cargo unit onto the transportation unit (step 608). The method may comprise transporting, via the transportation unit, the cargo unit from the first location to the second location (step 610). The method may comprise transferring the cargo unit from the transportation unit to a lift unit (step 612). The method may further comprise lifting, via the lift unit, the cargo unit to an elevation of a cargo deck of an aircraft (step 614).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An end-to-end cargo handling system, comprising:
 a transportation unit comprising a first sensing agent and a first transceiver;
 a lift unit comprising a second sensing agent and a second transceiver; and
 a control module in communication with the transportation unit and the lift unit via a network, wherein the transportation unit and the lift unit are configured to move a cargo unit from a first location to a second location autonomously, wherein the control module is operable to:
  command, via the network and through the first transceiver, the transportation unit to move to the first location, load the cargo unit, transport the cargo unit to the lift unit, and transfer the cargo unit from the transportation unit to the lift unit,
  command, via the network and through the second transceiver, the lift unit to move the cargo unit to an elevation of a cargo deck of an aircraft,
  command, via the network and through the second transceiver, the lift unit to transfer the cargo unit to the cargo deck,
  command, via the network and through the first transceiver, the end-to-end cargo handling system to move the cargo unit to the second location, and
  command, via the network and through an aircraft transceiver, an aircraft cargo loading door to close in response to completing loading of cargo units on the cargo deck.

2. The end-to-end cargo handling system of claim 1, wherein the first location is located on a freighter.

3. The end-to-end cargo handling system of claim 1, wherein the transportation unit is configured to self-load the cargo unit for transportation.

4. The end-to-end cargo handling system of claim 3, wherein the lift unit comprises one of a scissor lift, fork lift, conveyer belt, or overhead crane.

5. The end-to-end cargo handling system of claim 4, wherein the control module is configured to access one or more databases concerning a status of the cargo unit.

6. The end-to-end cargo handling system of claim 5, wherein the lift unit comprises a sensor capable of sensing a presence of the cargo unit on the lift unit.

7. The end-to-end cargo handling system of claim 1, wherein the first sensing agent and the second sensing agent each comprise a sensing module, a computing module, and a communication module.

8. The end-to-end cargo handling system of claim 7, wherein the lift unit and the transportation unit are configured to communicate via the communication module of the first sensing agent and the communication module of the second sensing agent to move the cargo unit from the first location to the second location.

* * * * *